Jan. 20, 1959 — C. H. VAN HARTESVELDT — 2,869,174
MOLDING PRESS GUIDE SYSTEM
Filed June 27, 1956 — 2 Sheets-Sheet 1

Inventor
CARROLL H. VAN HARTESVELDT

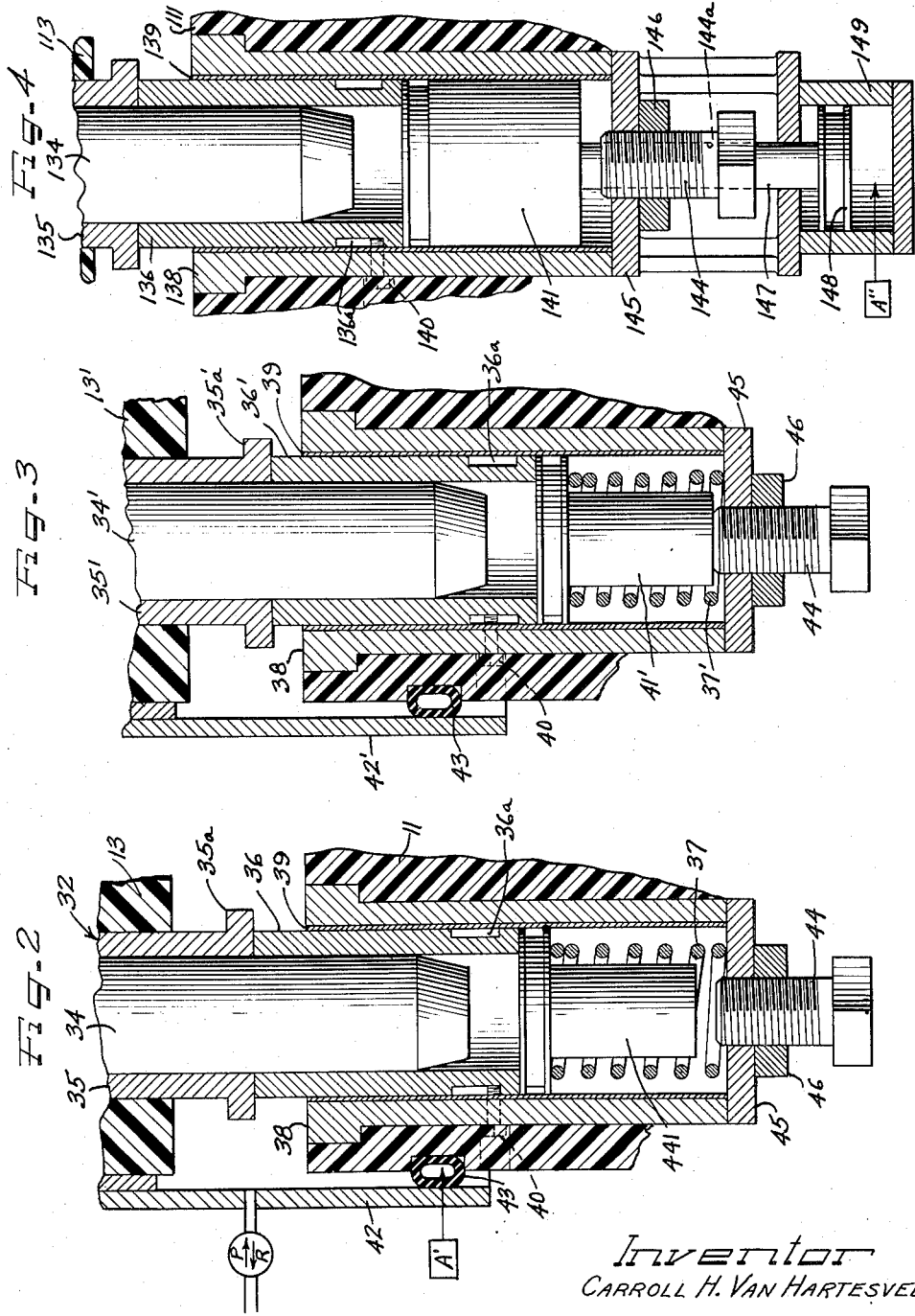

2,869,174
MOLDING PRESS GUIDE SYSTEM

Carroll H. Van Hartesveldt, Birmingham, Mich.

Application June 27, 1956, Serial No. 594,210

7 Claims. (Cl. 18—16)

This invention relates to molding apparatus, and more particularly, to a guide system for the relatively movable mold defining members in a molding press.

Although the instant molding apparatus may lend itself to a number of molding operations, the invention is particularly useful in the field of low pressure large size laminate molding, and, accordingly, the use thereof will be described primarily in connection with such molding. In recent times, there has been an increasing demand for large size laminated articles and it has been necessary to develop new molding techniques and devices to meet this demand. Heretofore, the most effective production method available for the manufacture of large size laminates involves the use of steam or water heated matched metal dies operating in a hydraulic press. As will be appreciated, for the larger laminates, these dies are extremely expensive; and the use of hydraulic press actuating means puts a practical limitation on the space available between the mold defining members when the mold is open.

Recently, there has been developed a molding press comprising large size light weight mold defining members made, for example, of heat resistant synthetic resins. In these devices one of the mold defining members is mounted on a stationary support and the others mounted in a carriage which is movable above the fixed mold defining member by means of a hoist or other relatively low power moving means, so that the space between the mold defining members in the open position may be quite substantial. When the pressure is to be applied between the mold defining members, the carriage is first lowered to approximately "closed mold" position (which actually is an open mold position) and strong linking arms are mounted to connect the carriage securely with the fixed mold defining member. The carriage mounted mold defining member is secured to a platen which is, in turn, movably mounted in the carriage. A fluid pressure responsive device such as a resilient bag is interposed between the carriage and the platen and is connected to fluid pressure means to selectively actuate the resilient device to urge the upper mold defining member carried by the platen into closed position with the lower mold defining member. Actual molding pressure between the mold defining members is thus applied by applying fluid pressure to the resilient bag and expanding the bag against the platen which, in turn, urges the movable mold defining member downwardly against the fixed mold defining member. The pressure thus applied is quite substantial, but the linking arms are strong enough to securely connect the carriage to the fixed molding member, so that a substantial amount of pressure may be applied through the resilient bag to molding material between the mold defining members.

The actual movement of the platen in response to actuation of the resilient bag is, of course, relatively slight, during which the upper or movable mold defining member is moved from approximately "closed mold" position to actual closed mold position whereat pressure is applied to the molding material. Even at approximately "closed mold" position, however, the movable mold member may rest in part or entirely on the molding material in the partially closed mold cavity. This may be undesirable if, for example, it is desired to seal off the partially closed mold cavity and evacuate the same before applying final molding pressure theerto. Such evacuation of the cavity tends to reduce entrapped air and multiply greatly the effectiveness of the final mold pressure in producing a molded article of uniform texture and with the minimum amount of entrapped gases therein. The effectiveness of such evacuation can, however, be reduced materially by permitting the movable mold member to rest upon some or all of the molding material before or during such evacuation.

Also, the low power hoist or similar device which permits substantial opening of the mold members, for the replacement of molding material or the like, does not permit accurate movement of the movable mold member so as to obtain perfect alignment with the fixed mold member. For this reason, it has been found that guide means carried by the mold member, preferably in the form of guide pins and guide pin sleeves suitable for telescopic engagement, are advantageously employed. It has been found, however, that the guide pins and sleeves ordinarily leave something to be desired in that they are not in proper alignment in both the partially closed and the completely closed mold positions, using the usual guide pin and sleeve arrangement.

Still another problem presented to molders in the uses of the instant light weight molds particularly is that there is a tendency for the molded material therein to adhere to the surfaces of the mold defining members and to make opening of the mold difficult.

The instant invention solves a number of the problems hereinbefore indicated by the use of resilient means for urging one of the guide means (such as the pin or sleeve) into engagement with the other of the guide means while the mold defining members are in the partially closed position. Such resilient means are designed to yield to the molding pressure applied through the fluid pressure actuated bag, so that actual molding pressure can be applied when desired. Such resilient means, however, move the guide means into proper alignment in the partially closed position and, equipped with suitable stop means, such resilient means hold the upper mold member off the molding material itself so that evacuation can be carried out satisfactorily. In addition, such resilient means apply force to open the mold members, after the molding cycle is completed and the pressure is released from the resilient bag.

It is, therefore, an important object of the present invention to provide an improved molding press.

It is a further object of the instant invention to provide an improved guide means for maintaining proper alignment between molding members in the partially closed as well as the closed positions.

Another object of the instant invention is to provide an improved molding press wherein yieldable resilient means are used to maintain the mold members in partially closed, but controlled, position so as to permit the evacuation of the mold cavity.

Yet another object of the instant invention is to provide resilient members associated with the guide means for urging the mold open after the cycle has been completed.

Other and further objects, features and advantages of the present invention will become apparent to those skilled in the art from the following detailed disclosure thereof and drawings attached hereto and made a part hereof.

On the drawings:

Figure 2 is a detail elevational view with parts shown in section and parts broken away of a guide pin and sleeve mounting for use in the molding press of Figure 1, embodying the instant invention, shown in partially closed position;

Figure 3 is a view corresponding to Figure 2 showing the same device in closed position; and Figure 4 is a view comparable to Figure 2 showing a different embodiment of the instant invention.

As shown on the drawings:

Figure 1:
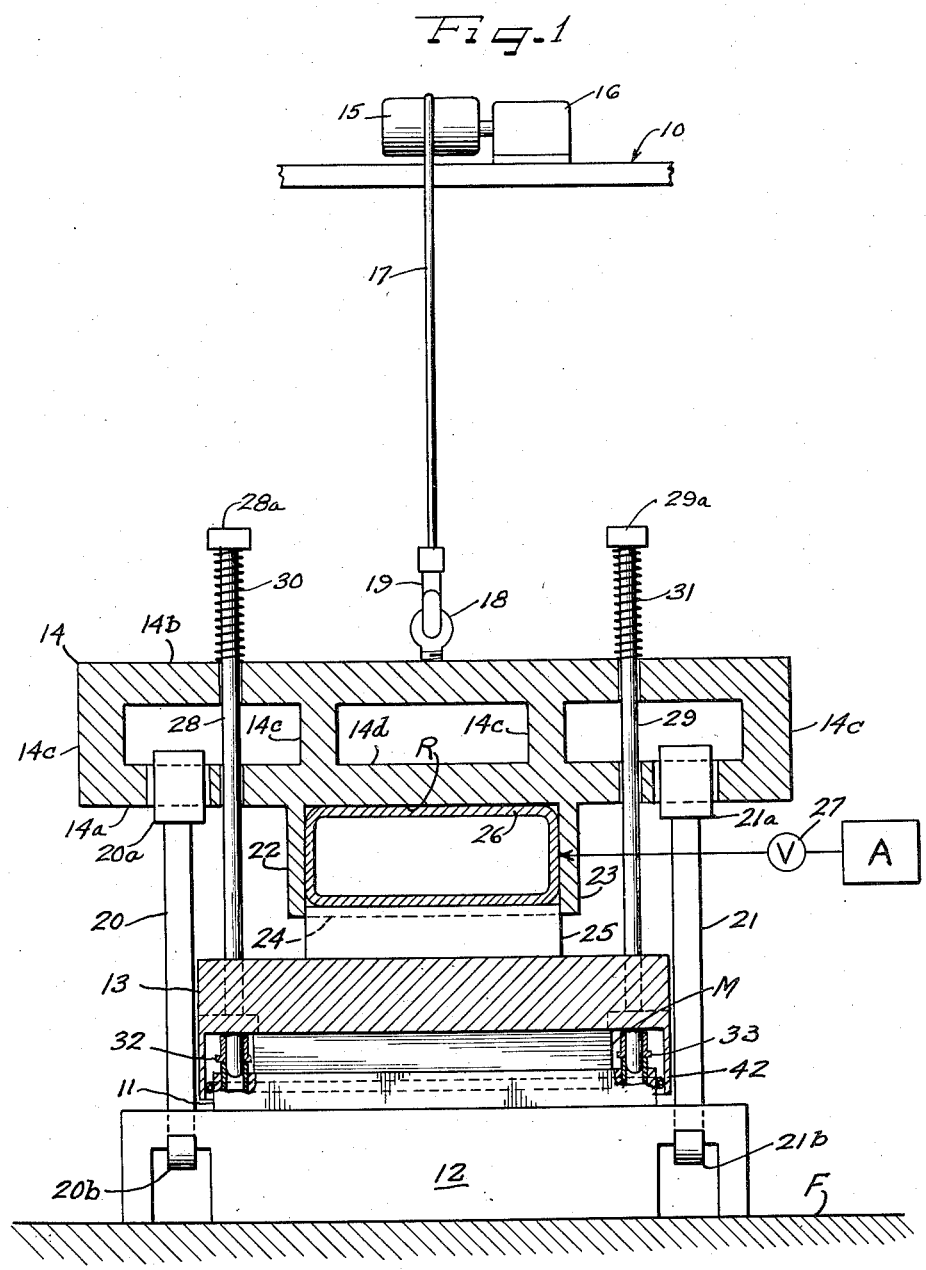
Figure 1 is an elevational view, with parts shown in section and parts shown diagrammatically of a molding press embodying the instant invention in "closed" position.

In Figure 1 the molding press, indicated generally by the reference numeral 10, is shown in "closed" position. The press 10 comprises a lower fixed mold defining member 11 secured (by bolts or the like, not shown) to a stationary frame 12 mounted on the floor or similar supporting structure F. A cooperating movable upper mold defining member 13 is mounted above the lower mold defining member 11, with the material to be molded M positioned therebetween. As will be appreciated, the mold defining members 11 and 13 here shown are substantially flat for the purpose of molding a large flat sheet of material M; but it will be appreciated that the mold defining members 11 and 13 may be suitably contoured so as to form laminated sheets in the shape of boats, bathtubs, or the like large size laminate articles.

A vertically movable carriage 14 (shown in section) is mounted for movement by a hoist, here shown as a rotatable drum 15, powered by a motor 16 and winding a cable 17 that connects to a ring 18 on the carriage 14 via a hook 19 in the customary manner. The carriage 14 is made of relatively strong structural elements in the form of a steel frame-work which is still sufficiently light to be carried by the lightweight hoist assembly 15, 16.

As shown in Figure 1 the carriage 14 is provided with a plurality of depending hooks 20, 21 which are looped at their tops 20a, 21a so as to be swingably mounted on a lower cross beam 14a of the carriage 14. The bottoms 20b and 21b of the members 20 and 21 are hooked under projecting frame portions 12a and 12b of the fixed support 12, so that the carriage 14 is, in the position shown in Figure 1, securely tied to the fixed support 12 and the fixed mold defining member 11 carried thereby.

As is indicated, the carriage 14 has lower cross beams at the position 14a and upper cross beams at the position 14b with spacers 14c therebetween for additional support. Actually, the carriage 14 in plan view is generally rectangular in shape and a total of four hooks are mounted at the corners, although only the front hooks 20 and 21 can be seen in the view of Figure 1.

The carriage 14 has a recess R therein defined by side walls (only three of which 22, 23 and 24 are here shown) and a back or top wall 14d. The walls 22, 23, 24 and a front wall (not shown) define a generally rectangular recess which slidably receives a generally rectangular platen 25. The platen 25 securely mounts the upper fold defining member 13 (as with bolts, not shown) and the platen 25 and upper mold defining member 13 move together. A resilient bag 26 or similar fluid expandable means is mounted within the recess R and against the top of the platen 25, or between the back wall 14d and the platen 25. A source of fluid under pressure such as a compressed air source A is connected through a valve 27 to the bag 26, as indicated diagrammatically, in order to selectively expand the bag 26 and urge the platen 25 downwardly and out of the recess R.

During the actual molding operation, it will be appreciated that the carriage 14 is so positioned with respect to the fixed mold elements 11 and 12 and the material M to be molded that only limited movement of the platen 25 and movable mold member 13 is involved when the bag 26 is actuated. In this way the sides of the bag 26 are continuously supported by the carriage side walls 22, 23, 24, and the platen 25 is never actually moved out of the recess R. Such limited movement is permitted by tie rods 28 and 29 which are securely embedded in the movable mold member 13, so as to afford a fixed connection between the tie rods 28, 29 and the movable mold member 13 as well as the platen 25. The tie rods 28 and 29 are slidably received by the carriage 14 and resiliently mounted thereon by springs 30 and 31. The tie rod 28 is permitted limited axial movement in the carriage 14 and the spring 30 which acts between the top beam 14b of the carriage 14 and a lock nut 28a at the top of the rod 28 is actually not under compression in the position shown in Figure 1, even when the bag 26 is actuated. This is because the carriage 14 is initially positioned in the "closed" position so that the upper mold defining member 13 is supported by means at 32 and 33 so as to take all compression off the spring 30. The same is true for the spring 31 cooperating with the lock nut 29a. Again, it will be appreciated that more than two tie rods 28, 29 and spring 30, 31 assemblies are used and preferably four are used to mount the four corners of the generally rectangular mold member 13 and platen 25.

To open the press 10, the bag 26 is first deflated so that no downward pressure is applied to the upper mold member 13. Then the hooks 20, 21 are disconnected from the fixed support 12. Next, the hoist assembly 15, 16 lifts the carriage 14 to the "open" position. At this time, the springs 30 and 31 are loaded slightly so as to support the weight of the platen 25 and upper mold member 13. The springs 30 and 31 are resilient means which are strong enough to support the weight of the upper mold member 13 and the platen 25, while retaining the platen 25 in approximately its normal operating position, which is within the mouth of the recess R as shown in Figure 1.

In the "open" position, operators may have ready access to the lower mold member 11 and may lay down the sheets of resin impregnated fabric, or whatever molding material M is being used. If however, the compressed air valve 27 should develop a leak or be turned on accidentally the bag 26 would again be actuated and would urge the platen 26 downwardly. Tie rods of the size of the tie rods 28 and 29 here shown which might be securely fixed to the carriage 14 would be readily sheared by the extremely great force which can be generated through the actuation of the bag 26. Accordingly, it has been necessary to mount the platen 25 on resilient means, as here shown, via the springs 30 and 31. The springs 30 and 31 will yield to the actuated bag, so that the bag may force the platen 25 completely out of the recess R and the bag will expand carrying the platen 25 out of the recess R itself. Once the platen 25 has cleared the side walls 22, 23, 24 and the bag 26 has also cleared, the bag 26 will expand sideways in the direction of least resistance and will no longer urge the platen 25 downwardly. The bag may then rupture; but the platen will not be dropped down on operators working in the open mold. The springs 30 and 31 are, of course, compressible to the extent necessary to permit such movement of the platen 25 out of the recess R.

Partly because of the resilient means, 30, 31 mounting the molding member 13, and because it is desirable to hold the molding member 13 above the molding material M during an evacuation period, it has been necessary to provide means for suitably aligning and supporting the molding members 11 and 13. Such means are shown only generally in Figure 1 as guide pin and sleeve assemblies 32 and 33.

Referring now to Figures 2 and 3 which show in detail two positions of the guide pin and sleeve assembly 32. Figure 2 shows the assembly 32 in the partially closed position and Figure 3 shows the same assembly in completely closed position. Referring specifically to Figure 2, it will be seen that there is shown a lower fixed mold defining member 11 and an upper movable mold defining member 13. The upper mold defining member 13 mounts in rigid assembly a guide pin 34 carried in a sleeve 35 and retained in fixed position in the resin body or matrix of the mold member 13. The sleeve 35 is provided with a bottom flange 35a which engages the top surface of a movable sleeve 36 for the guide pin 34. Proper alignment between the molding members 11 and 13 is achieved by the telescopic engagement between the guide pin 34 and the guide pin sleeve 36. The sleeve 36 is urged upwardly by resilient means, here shown in the form of a spring 37.

Referring to the assembly 32 in detail, it will be noticed that the lower molding member 11 mounts a fixed sleeve 38 in the resin matrix. A fixed liner 39 of a soft bearing metal such as brass is mounted within the sleeve 38 and provides a bearing surface permitting relative axial movement of the guide pin sleeve 36 while maintaining proper alignment. Near its bottom the guide pin sleeve 36 is provided with an annular recess 36a and a set screw 40 carried by the mounting sleeve 38 extends into the annular groove 36a and acts as a stop to limit upward movement of the sleeve 36. A plunger 41 actuated by the spring 37 urges the sleeve 36 upwardly against the set screw 40. The position of the set screw 40 thus determines the position of the upper end of the guide pin sleeve 36, which in turn acts with the flange 35a to determine the position of the upper mold member 13.

In the arrangement of Figure 2 the mold members 11 and 13 are positioned in the so called approximately "closed mold" position wherein the upper mold member 13 has not quite been brought to bear against the material M to be molded. In this position, however, a peripheral skirt 42 secured to the upper mold member 13 extends down over the peripheral edge of the fixed mold member 11 and over a peripherally aligned hose 43 connected to a source of air A' under pressure (here shown diagrammatically). When the hose 43 is actuated by the air it forms a seal with the skirt 42 and effectively closes off the area between the mold members 11 and 13. This area may then be evacuated by a reversible air pump RP (shown diagrammatically). The spring 37 is designed so as to be sufficiently strong to resist the downward forces applied to the upper mold member 13 by the creation of a vacuum between the mold members 11 and 13; and this spring 37 thus maintains the mold members 13 and 11 in properly spaced position, while the guide pin 34 and the sleeve 36 in telescopic engagement maintain the mold members 11 and 13 in proper alignment. As shown in Figure 3, after evacuation of the mold has been completed the full molding pressure may be applied to the bag 26 (Figure 1), which exerts a force sufficient to overcome the spring 37'. As will be noted the same elements in Figures 2 and 3 which are unchanged in position are given the same reference numerals, while those which are changed are given a corresponding primed reference numeral. In the position of Figure 3 the guide pin 34' and mounting sleeve 35' carried by the upper mold member 13' have been urged downwardly, also urging the guide pin sleeve 36' downwardly. This, in turn, moves the plunger 41' downwardly against a set screw 44 mounted in a base plate 45 secured to the bottom of the mounting sleeve 38 by suitable means, such as welds (not shown). The set screw 44 is threadedly received by the base plate 45 for axial adjustment and, once adjusted, is secured in the adjusted position by a lock nut 46. The set screw 44 determines the extent of downward movement of the plunger 41' and, therefore, the extent of downward movement of the movable upper mold member 13'.

Referring now to Figure 4 it will be noted that the elements therein which are the same as elements shown in Figures 2 and 3 will have the same reference numeral in the 100 series. Thus, a guide pin 134 carried in a mounting sleeve 135 is mounted in the resin matrix of the upper mold member 113. A lower mold member 111 carries a mounting sleeve 138 provided with an internal bearing liner 139 slidably receiving and aligning a guide pin sleeve 136. Upward movement of the guide pin sleeve 136 is limited by a set screw 140 received in an annular groove 136a in the guide pin sleeve 136. A plunger 141 resiliently urges the guide pin sleeve 136 upwardly against the set screw 140 and downward movement of the plunger 140 is limited by an adjustable set screw 144 threadedly received by a base plate 145 secured to the mounting sleeve 138 and secured in adjusted position by a lock nut 146. The adjustable set screw 144 is, however, provided with an axial bore 144a which receives a plunger rod 147 connected directly to the plunger 141. The plunger rod 147 extends axially through the set screw 144 and is connected to a piston 148 within a cylinder 149. The cylinder 149 is connected to a source of air A'' under pressure (here shown diagrammatically) in the usual manner so that the air may act against the bottom of the piston 148 to resiliently urge the same upwardly. The piston and cylinder 148, 149 thus provides a resilient means to replace the spring 37 of the embodiment shown in Figures 2 and 3. The piston and cylinder 148, 149 has the additional advantage that the actual resilient force applied can be controlled. Thus, in the case of initial evacuation of the mold, it might be desirable to employ only a relatively small amount of resilient force to hold the upper mold member 113 in position (and to apply a force which may be easily overcome by the main molding force from the resilient bag 26). After the molding cycle is over, however, it may be desirable to employ a much greater lifting force against the bottom of the piston 148 in order to overcome the tendency of the molded material to adhere to the walls of the molding members 111, 113.

It will be understood that modifications and variations may be effected without departing from the scope of the novel concepts of the present invention.

I claim as my invention:

1. A molding press comprising first and second mold defining members movable selectively into open and closed positions, said members having cavity-defining rigid molding walls and contiguous peripherally disposed rigid face portions, fluid pressure actuated means urging said members toward closed position, guide pins mounted in the face portions of said first member, guide pin sleeves receiving said guide pins and mounted on the face portions of said second member, and resilient means on said second member urging said sleeves away from said second member and toward said pins to align the members before the members are moved to closed position, said resilient means being yieldable to said fluid pressure actuated means to permit the same to close the mold members.

2. A molding press comprising a lower fixed mold defining member and an upper movable mold defining member cooperating therewith to move selectively into open and closed positions, a vertically movable carriage, an upper platen carrying said upper mold defining member, a fluid pressure responsive device interposed between said carriage and said platen, fluid pressure means selectively actuating said device to urge the upper mold defining member carried by the platen into closed position, guide pins carried by the upper member, guide pin sleeves carried by the lower member for receiving said guide pins, resilient means on the lower member urging said sleeves away from said lower member and into engagement with said guide pins to hold the mold members open, said resilient means being yieldable to said actuated fluid pressure responsive device to permit said device to move the members into closed position, and stop means cooperating with said sleeves to limit movement thereof toward said pins and thus limit the extent to which mold members are held open by the resilient means when the fluid pressure responsive device is not actuated.

3. A molding press comprising a lower fixed mold defining member and an upper movable mold defining member cooperating therewith to move selectively into open and closed positions, a vertically movable carriage, an upper platen carrying said upper mold defining member, a fluid pressure responsive device interposed between said carriage and said platen, fluid pressure means selectively actuating said device to urge the upper mold defining member carried by the platen into closed position, guide pins carried by the upper member, guide pin sleeves carried by the lower member for receiving said guide pins, resilient means on the lower member urging said sleeves away from said lower member and into engagement with said guide pins to hold the mold members open, said resilient means being yieldable to said actuated fluid pressure responsive device to permit said device to move the members into closed position, stop means cooperating with said sleeves to limit movement thereof toward said pins and thus limit the extent to which mold members are held open by the resilient means when the fluid pressure responsive device is not actuated, and sealing means selectively engaging said mold defining members to seal off the mold cavity defined thereby when said members are held open by said resilient means.

4. A molding press comprising a lower fixed mold defining member and an upper movable mold defining member cooperating therewith to move selectively into open and closed positions, a vertically movable carriage, an upper platen carrying said upper mold defining member, a fluid pressure responsive device interposed between said carriage and said platen, fluid pressure means selectively actuating said device to urge the upper mold defining member carried by the platen into closed position, guide pins carried by the upper member, guide pin sleeves carried by the lower member for receiving said guide pins, resilient means on the lower member urging said sleeves away from said lower member and into engagement with said guide pins to hold the mold members open, said resilient means being yieldable to said actuated fluid pressure responsive device to permit said device to move the members into closed position, stop means cooperating with said sleeves to limit movement thereof toward said pins and thus limit the extent to which mold members are held open by the resilient means when the fluid pressure responsive device is not actuated, and sealing means selectively engaging said mold defining members to seal off the mold cavity defined thereby when said members are held open by said resilient means, and mold cavity evacuating means cooperating with said sealing means to draw vacuum in the mold cavity when the same is sealed off.

5. A molding press comprising a lower fixed mold defining member and an upper movable mold defining member cooperating therewith to move selectively into open and closed positions, a vertically movable carriage, an upper platen carrying said upper mold defining member, a fluid pressure responsive device interposed between said carriage and said platen, fluid pressure means selectively actuating said device to urge the upper mold defining member carried by the platen into closed position, guide pins carried by the upper member, guide pin sleeves carried by the lower member for receiving said guide pins, resilient spring means on the lower member urging said sleeves away from said lower member and into engagement with said guide pins to hold the mold members open, said resilient means being yieldable to said actuated fluid pressure responsive device to permit said device to move the members into closed position, and stop means cooperating with said sleeves to limit movement thereof toward said pins and thus limit the extent to which mold members are held open by the resilient means when the fluid pressure responsive device is not actuated.

6. A molding press comprising a lower fixed mold defining member and an upper movable mold defining member cooperating therewith to move selectively into open and closed positions, a vertically movable carriage, an upper platen carrying said upper mold defining member, a fluid pressure responsive device interposed between said carriage and said platen, fluid pressure means selectively actuating said device to urge the upper mold defining member carried by the platen into closed position, guide pins carried by the upper member, guide pin sleeves carried by the lower member for receiving said guide pins, resilient fluid pressure actuated means on the lower member urging said sleeves away from said lower member and into engagement with said guide pins to hold the mold members open, said resilient means being yieldable to said actuated fluid pressure responsive device to permit said device to move the members into closed position, and stop means cooperating with said sleeves to limit movement thereof toward said pins and thus limit the extent to which mold members are held open by the resilient means when the fluid pressure responsive device is not actuated.

7. A molding press comprising first and second mold defining members movable selectively into open and closed positions, said members having cavity-defining rigid molding walls and contiguous peripherally disposed rigid face portions, fluid pressure actuated means urging said members toward closed position, guide pins mounted in the face portions of said first member, guide pin sleeves receiving said guide pins and mounted on the face portions of said second member, resilient means on said second member urging said sleeves away from said second member and toward said pins to align the members before the members are moved to closed position, said resilient means being yieldable to said fluid pressure actuated means to permit the same to close the mold members, and adjustable stop means mounted in said second member limiting movement of said sleeves toward said second member.

References Cited in the file of this patent

UNITED STATES PATENTS

| 1,174,646 | Williams | Mar. 7, 1916 |
|---|---|---|
| 2,296,072 | Tucker | Sept. 15, 1942 |
| 2,509,783 | Richardson | May 30, 1950 |
| 2,671,940 | Billner | Mar. 16, 1954 |
| 2,696,184 | Demarest | Dec. 7, 1954 |